Patented July 9, 1929.

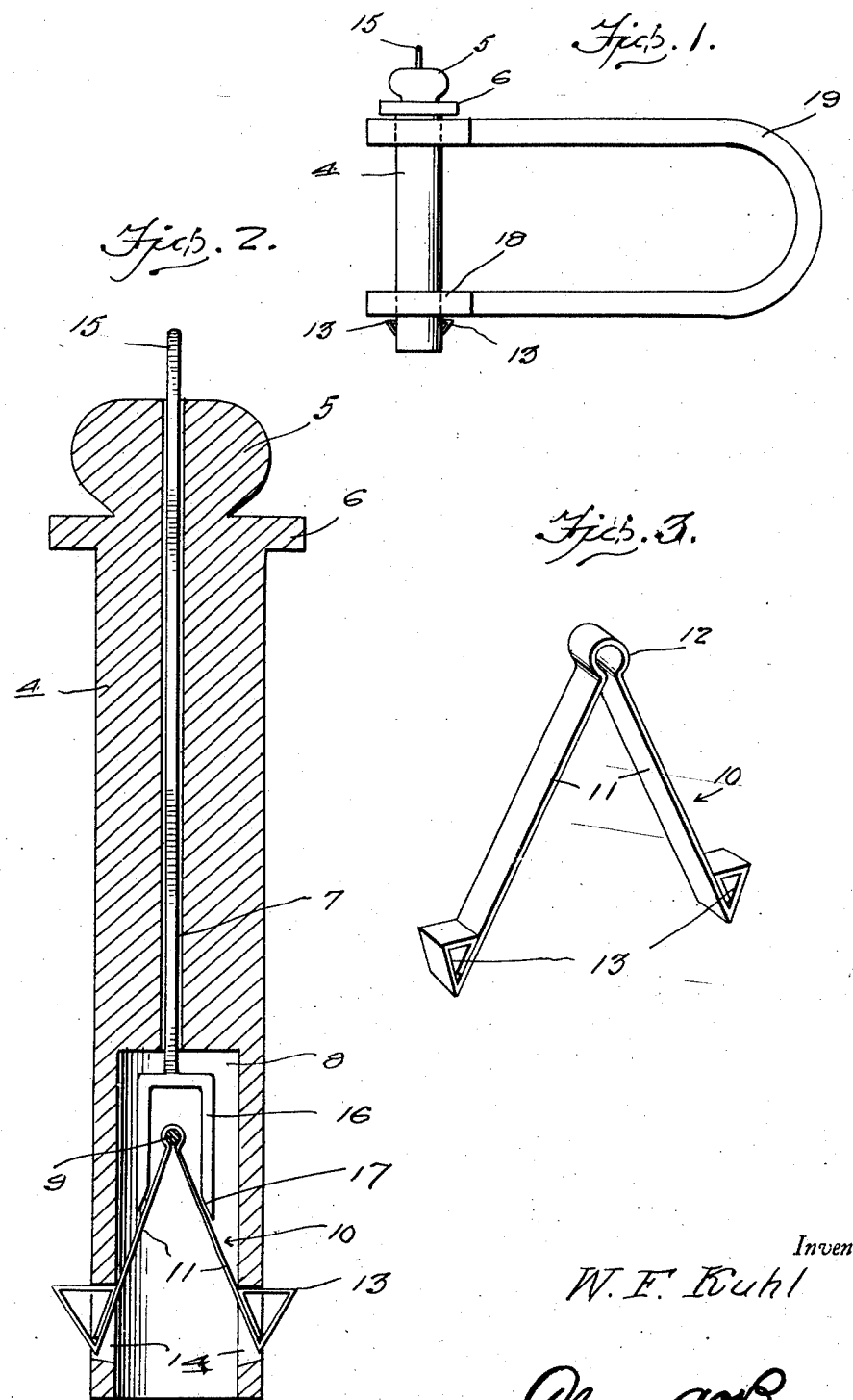

UNITED STATES PATENT OFFICE.

WALTER F. KUHL, OF BEAUMONT, ALBERTA, CANADA.

CLEVIS PIN.

Application filed July 2, 1928. Serial No. 289,935.

The present invention relates to new and useful improvements in clevis pin structures, but the invention is not to be restricted to this particular use for it is equally well adaptable for other useful purposes.

My principal aim is to generally improve upon clevis pin constructions, by providing one which is of characteristic and individual construction, the same being such as to make it more serviceable and desirable than clevis pins with which I am familiar.

Other features and advantages of the invention will become apparent from the following description and drawings.

In the drawings:—

Figure 1 is a top plan view of a clevis with a pin constructed in accordance with the invention.

Fig. 2 is an enlarged longitudinal section through the structure, with certain of the parts shown in elevation.

Fig. 3 is a perspective view of a novel retainer spring.

The body of the pin is represented by the reference character 4, the same being of general cylindrical configuration, and formed at one end with a knob 5 adjacent to which is an outstanding stop flange 6. This body is provided with a central longitudinal bore 7 communicating with an enlarged counterbore 8 forming a socket.

A cross pin 9 is located in the socket, and a novel retainer spring is mounted upon this, the spring being generally designated by the reference numeral 10. The spring is formed from a single length of flat metal which is bent upon itself as shown better in Fig. 3, to provide a substantially V-shaped body. This includes a pair of diverging arms 11, connected with a bearing head 12 which embraces the pin 9.

The arms 11 terminate in suitably bent keepers 13, which are swingable outwardly through slots 14, cut in the wall of the socket 8.

Cooperable with the retainer 10, is a plunger rod extending beyond the small bore 7. This is provided at its inner end with a fork located in the socket 8, the arms thereof being designated by the numeral 16. These arms terminate in beveled extremities 17 having sliding cam contact with the arms 11 of the spring. The result is that by placing the thumb against the outer projecting end of the rod 15, and forcing it inwardly, the fork arms will slidably contact the arms 11, and move the arms 11 toward each other, to retract the keepers 13 into the socket 8. The pin can then be readily inserted into the eyes 18 of the clevis 19.

Then when the rod 15 is released, the keepers expand and are held in place in an obvious manner. To remove the pin the operation just described is repeated.

It is submitted that a clevis pin of this type saves much time in that it can be inserted in an instant, wherein the ordinary pin must be either screwed into the clevis 5, or fastened in place with a retaining nut. If the pin is inserted, it will hold in a dependable manner and it can be removed as easily and quickly as it is put into place.

The pin will last indefinitely, but in case it need repairing, this can be quickly and easily done. By removing the rivet or cross pin which holds the retaining spring in place, the spring can be removed and the plunger or releasing rod, likewise removed.

It is thought however, that persons familiar with pins of this character will be able to appreciate the advantages. Therefore, a more lengthy description is regarded unnecessary.

Minor changes in shape, size, and rearrangement of parts, coming within the field of invention claimed, may be resorted to if desired.

Having thus described my invention, what I claim as new is:—

A clevis pin comprising a body formed with a longitudinal bore opening through one end, and a counter-bore opening through the opposite end, said counter-bore constituting a socket and having slots formed therein, a substantially V-shaped resilient retainer mounted in said socket, and a cross pin engaging said retainer and holding the same in place, said retainer including outwardly diverging arms having substantially triangular shaped keepers formed on the terminals thereof normally projecting through the slots in the sockets, a rod slidable through the longitudinal bore having a fork formed on its inner end straddling said pin and engaging the arms of the resilient spring retainer, whereby upon movement of the rod in one direction, the arms will be compressed and the keepers moved in said slots.

In testimony whereof I affix my signature.

WALTER F. KUHL.